May 11, 1948.  A. WAYNE  2,441,461
ELECTRIC UTILITY CONNECTION
Filed Nov. 19, 1945
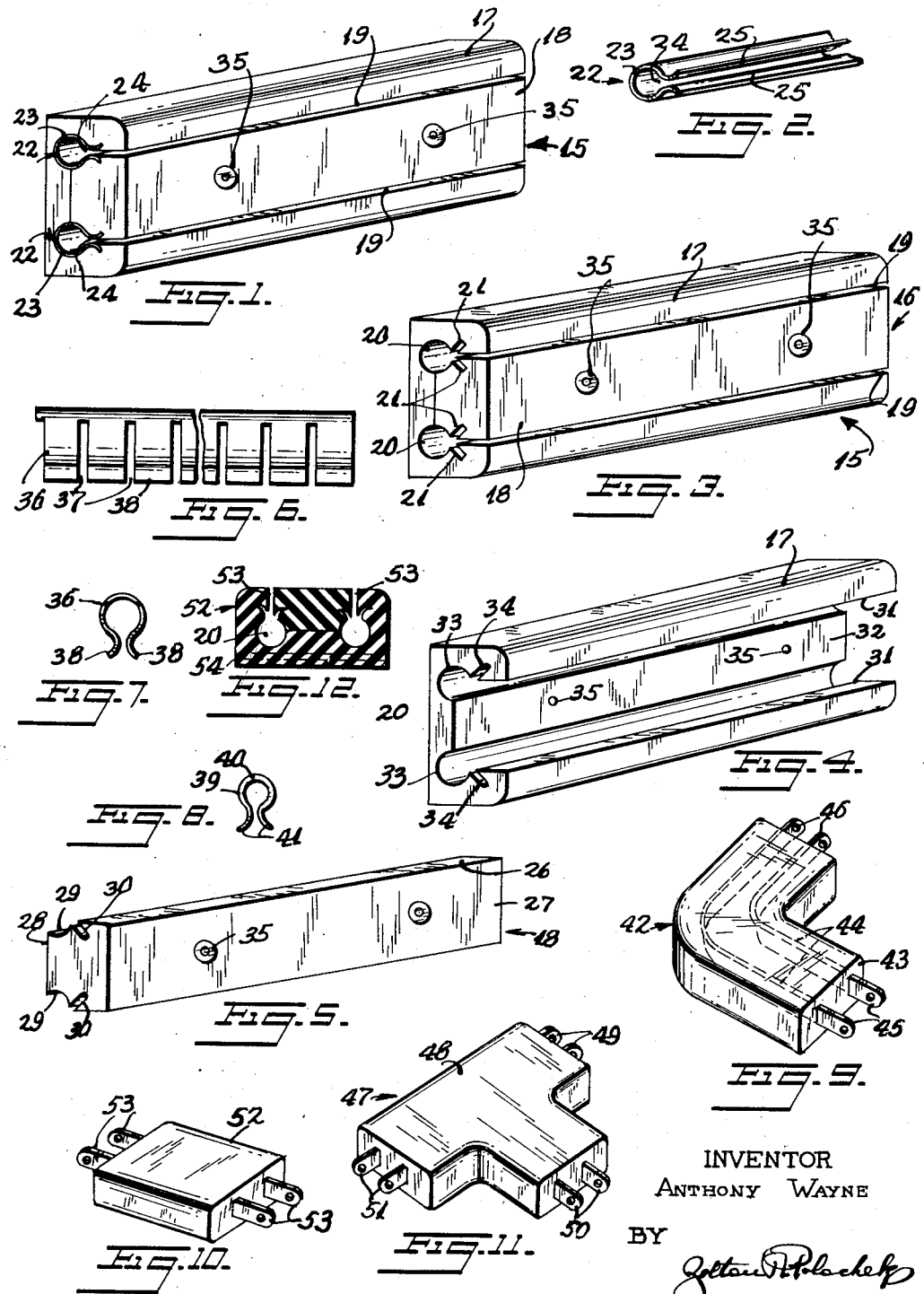
INVENTOR
ANTHONY WAYNE
BY
ATTORNEY Patented May 11, 1948

2,441,461

UNITED STATES PATENT OFFICE 2,441,461

ELECTRIC UTILITY CONNECTION

Anthony Wayne, New York, N. Y.

Application November 19, 1945, Serial No. 629,383

1 Claim. (Cl. 173—334.1)

This invention relates to new and useful improvements in electric utility connections.

More specifically, the present invention proposes the construction of electric circuit means characterized by an insulated moulding which provides a continuous electric outlet track so that an ordinary pronged electric plug can be inserted anywhere along its length and slid along the track.

Another object is to provide means whereby the prongs of a plug, when inserted, will be gripped and held within the track moulding.

Still another object is to form my moulding and elongated tubular contacts so that they are easily assembled and disassembled.

A further object is to provide means to attach the moulding to a wall or baseboard without interference with the electric circuit.

Another object is to provide connecting strips in the form of two or three-way connections to form a continuous outlet system around a room and up its walls.

A further object is to form my assembled moulding so that it can be stored and shipped in rolls.

Still another object is to form the tubular contacts so that they can be stored and shipped in rolls.

I accomplish these and other objects by providing a track moulding comprised of two sections and by using a special new kind of wire of my invention. The moulding is formed with slots and recesses which contain the special wire and permit the plug to be inserted and held anywhere along the length of the molding.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a strip of my circuit track molding with electric wire positioned therein.

Fig. 2 is a perspective view of a strip of an elongated tubular contact shown positioned in the moulding in Fig. 1.

Fig. 3 is a perspective view of the strip of track moulding shown in Fig. 1 with the tubular contact removed therefrom.

Fig. 4 is a perspective view of the outer section of the track moulding shown in Fig. 1.

Fig. 5 is a perspective view of the inner portion of the track moulding shown in Fig. 1.

Fig. 6 is a front view of another form of an elongated tubular contact that can be used with the track moulding.

Fig. 7 is a side view of the tubular contact shown in Fig. 6.

Fig. 8 is an end view of still another form of a tubular contact that can be used with the track moulding.

Fig. 9 is a perspective view of an elbow that may be used to connect strips of track moulding at an angle to each other.

Fig. 10 is a perspective view of a connection which may be used in the track moulding.

Fig. 11 is a perspective view of a three way connection that may be used to join my horizontally and vertically positioned strips of track moulding.

Fig. 12 is a transverse section of another form of track moulding.

Referring to the drawings in greater detail, the electric circuit moulding 15, shown in Figs. 1 to 5 inclusive, is comprised of a non-conductive track moulding 16, which may be of plastic, said moulding having an outer portion 17 and an inner portion or filler strip 18. The track moulding has two longitudinal slots 19 extending inwardly from its front and spaced the same distance apart as the prongs of a conventional electric plug. Each of the slots 19 joins a recess 20 which terminates in grooves 21. A resilient tubular contact 22 is in the form of a tube 23 with a longitudinal slit 24 and shoulders 25 positioned on each side of the slit and flaring outwardly. The distance between the shoulders is slightly less than the thickness of the plug prong. The contact 22 is positioned in the track moulding 16 with its tube portion 23 in the recess and its shoulder 25 extending in the groove 21.

The inner portion 18 of the track moulding has sides 26 which constitute the lower and upper faces of the slots 19, a front 27 which forms a portion of the front of the track moulding, and a rear face 28 which is parallel to the front face 27 and spaced therefrom so as to include a portion of the recess comprising curved portions 29 of the recess and a groove portion 30 of the recess. The outer portion 17 of the track moulding has sides 31 which constitute the remaining faces of the slots 19, an inner face 32 formed to contact the rear face 28 of the inner portion in the assembled moulding, curved portions 33 and grooves 34 which together with curved portions 29 and grooves 30 of the inner section complement and complete the recesses 20 and grooves 21 of the assembled track moulding 16.

The circuit moulding 15 is assembled in the following manner: The outer portion 17 is positioned lying on its back with its face 32 upward. Tubular contact 22 is placed in each of the partial recesses 33 with one of the shoulders 25 extending into the groove 34. The inner portion 18 is then slid along the face 32 of the outer portion with the back face 28 of the inner portion in contact with the face 32, the remaining shoulder 25 of the contact 22 having been flexed and positioned in the grooves 30 of the inner portion.

Holes 35 extending through and aligned in the outer and inner portions of the moulding are utilized to secure the moulding to the wall or baseboard by screw attaching means.

In operatively employing the installed and connected circuit moulding, a conventional pronged electric plug can be inserted anywhere along the moulding with a prong in each slot extending into the recess and establishing contact with the wires. These shoulders being resilient, will be forced further apart by the plug prongs and will grip them, preventing disassembly of the plug.

In Figs. 6 and 7, another form of tubular contact 36 is similar in cross section to the contact 22 heretofore described and has a number of transverse slits 37 whose width is less than the width of the prong of an electric plug. The function of these slits is to increase the resiliency of shoulders 38 and also to increase the flexibility of the wire so that it can be rolled prior to installation. In other respects, the wire is similar to the contact 22 and can be positioned similarly in the non-conductive track moulding 16 which may be made of flexible plastic or rubber or the like, so that the ensemble can be stored and shipped in rolls.

In Fig. 8, still another form of electric wire 39 consists of a body portion 40 and two resilient fins 41 flaring outwardly and spaced apart a distance slightly less than the thickness of a prong of an ordinary electric plug. As before, the contact can be installed in the track moulding 16 and the fins can be forced apart to admit the plug prong and grip it.

In Fig. 9, a two-way connecting moulding 42 is formed of a non-conductive body portion 43 containing two conductor wires 44 joined to prong contacts 45 and 46 at an angle to each other. These contacts 45 and 46 are spaced so that they are capable of being plugged into the tube 23 at the end of the track moulding strip 16 and therefore can provide a continuous strip around a room. In addition, the electric circuit is thus made continuous.

In Fig. 10, a connector 52 is shown with prong 53 at opposite sides.

In Fig. 11, a three-way connecting moulding 47, provides a means for a continuous electric and moulding system in a room including vertical mouldings. The connecting moulding 47 is formed of a non-conductive body portion 48 and prong contacts 49, 50, and 51, joined to each other inside the connector by electric wires. Prongs 50 extend in a direction at right angles to prongs 49 and 51 and as in the two-way connector 42 can be joined to the wires within the track moulding strips 16.

In Fig. 12, the non-conductive track moulding 52 is formed to be installed with slots 53 at the top of the moulding instead of in the front as in track moulding 16 so that the electric plug may be inserted in through the top of the moulding. Holes 54 are positioned below the recesses 20 and permit the moulding to be secured to the wall by screw attaching means without cutting across the wires. In other respects, this track moulding is similar to moulding 16.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

In an electrical conduit moulding, an elongated bar of insulating material having a plane face, an open top rectangular groove in said bar extending from the plane face, longitudinally extending arcuate grooves formed in said elongated bar at the lower corners of said rectangular groove, said elongated bar having diagonally disposed grooves therein contiguous to each of the arcuate grooves, an elongated filler strip adapted to fit within said rectangular groove with its face co-planar with the face of said elongated bar and its sides parallel to but spaced apart inwardly from the sides of the rectangular groove in the elongated bar so as to form parallel slots therewith, said filler strip having arcuate recesses on its inner corners complementary to the arcuate grooves in said elongated bar and angularly disposed grooves therein contiguous to said arcuate recesses, and elongated contact members having longitudinal slots therein and outwardly flared shoulders thereon, said elongated contact members being held in the arcuate grooves in the elongated bar by said elongated filler strip with said slots therein in registry with the slots intermediate the walls of said rectangular groove in said elongated bar and the sides of said elongated filler strip, and the outwardly flared shoulders received one in a diagonal groove in the elongated bar and the other in an angularly disposed groove in said elongated filler strip.

ANTHONY WAYNE.

REFERENCES CITED

The following references are of record in the file of this patent:

UNITED STATES PATENTS

| Number | Name | Date |
|---|---|---|
| 1,815,509 | Hoecher | July 21, 1931 |
| 1,955,168 | Beersman | Apr. 17, 1934 |
| 2,073,535 | Kennedy | Mar. 9, 1937 |
| 2,175,144 | Davison | Oct. 3, 1939 |
| 2,240,180 | Frank | Apr. 29, 1941 |
| 2,250,513 | Von Gehr | July 29, 1941 |
| 2,284,097 | La Jone | May 26, 1942 |